US009635577B2

(12) United States Patent
Seo et al.

(10) Patent No.: US 9,635,577 B2
(45) Date of Patent: Apr. 25, 2017

(54) METHOD AND DEVICE FOR MEASURING A REFERENCE SIGNAL RECEIVED QUALITY IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 174 days.

(21) Appl. No.: 14/364,613

(22) PCT Filed: Dec. 12, 2012

(86) PCT No.: PCT/KR2012/010775
§ 371 (c)(1),
(2) Date: Jun. 11, 2014

(87) PCT Pub. No.: WO2013/089421
PCT Pub. Date: Jun. 20, 2013

(65) Prior Publication Data
US 2014/0348015 A1    Nov. 27, 2014

Related U.S. Application Data

(60) Provisional application No. 61/569,779, filed on Dec. 12, 2011.

(51) Int. Cl.
*H04W 24/10* (2009.01)
*H04J 11/00* (2006.01)
(Continued)

(52) U.S. Cl.
CPC ........... *H04W 24/10* (2013.01); *H04J 11/005* (2013.01); *H04B 7/26* (2013.01); *H04J 2211/001* (2013.01);
(Continued)

(58) Field of Classification Search
CPC .. H04J 2211/001; H04J 11/005; H04J 11/001; H04J 11/00; H04W 24/10;
(Continued)

(56) References Cited

U.S. PATENT DOCUMENTS

| 2011/0286346 | A1* | 11/2011 | Barbieri | H04B 17/327 370/252 |
| 2012/0082047 | A1* | 4/2012 | Wu | 370/252 |
| 2012/0122472 | A1* | 5/2012 | Krishnamurthy | H04L 5/0053 455/456.1 |
| 2013/0003578 | A1* | 1/2013 | Hu | H04W 24/00 370/252 |

FOREIGN PATENT DOCUMENTS

| KR | 10-2010-0111608 | 10/2010 |
| KR | 10-2011-0044875 | 5/2011 |

(Continued)

OTHER PUBLICATIONS

"Resource Specific RRM", 3GPP TSG RAN WG1 Meeting #63bis, Jan. 31, 2011. et al. (hereinafter referred as Song) US Publication No. 2011/0275394 A1.*

(Continued)

*Primary Examiner* — Ian N. Moore
*Assistant Examiner* — Mewale Ambaye
(74) *Attorney, Agent, or Firm* — Lee Hong Degerman Kang Waimey

(57) ABSTRACT

A method for measuring by a terminal at least one or more transmission points among a first transmission point and a second transmission point, which are neighboring cells, in a wireless communication system. The method includes: measuring a reference signal strength indicator (RSSI) in a predetermined resource of a subframe; and measuring reference signal received quality (RSRQ) from the RSSI and reference signal received power (RSRP), where the predetermined resource is associated with the setting of an almost blank subframe (ABS) of the first transmission point for the subframe.

11 Claims, 10 Drawing Sheets

(51) Int. Cl.
  *H04W 24/08* (2009.01)
  *H04W 48/16* (2009.01)
  *H04B 7/26* (2006.01)
  *H04W 72/08* (2009.01)
  *H04W 52/24* (2009.01)

(52) U.S. Cl.
  CPC ............ *H04W 24/08* (2013.01); *H04W 48/16* (2013.01); *H04W 52/244* (2013.01); *H04W 72/085* (2013.01)

(58) Field of Classification Search
  CPC ..... H04W 24/00; H04W 24/08; H04W 48/16; H04W 72/085; H04W 52/244; H04B 7/26
  See application file for complete search history.

(56) References Cited

FOREIGN PATENT DOCUMENTS

| KR | 10-2011-0097623 | 8/2011 |
|---|---|---|
| KR | 10-2011-0108284 | 10/2011 |

OTHER PUBLICATIONS

PCT International Application No. PCT/KR2012/010775, Written Opinion of the International Searching Authority dated Mar. 21, 2013, 16 pages.

\* cited by examiner

FIG. 5
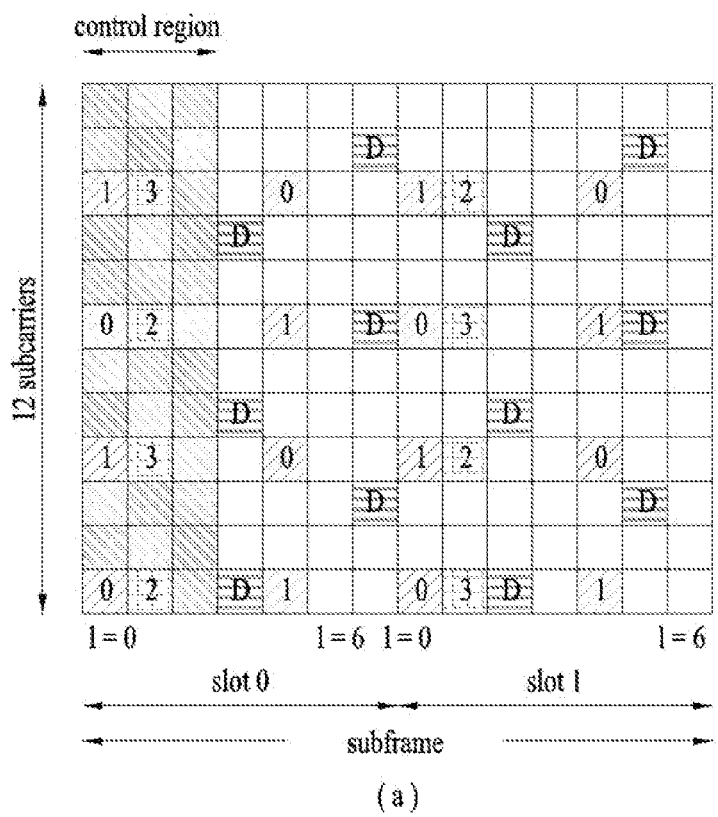
(a)
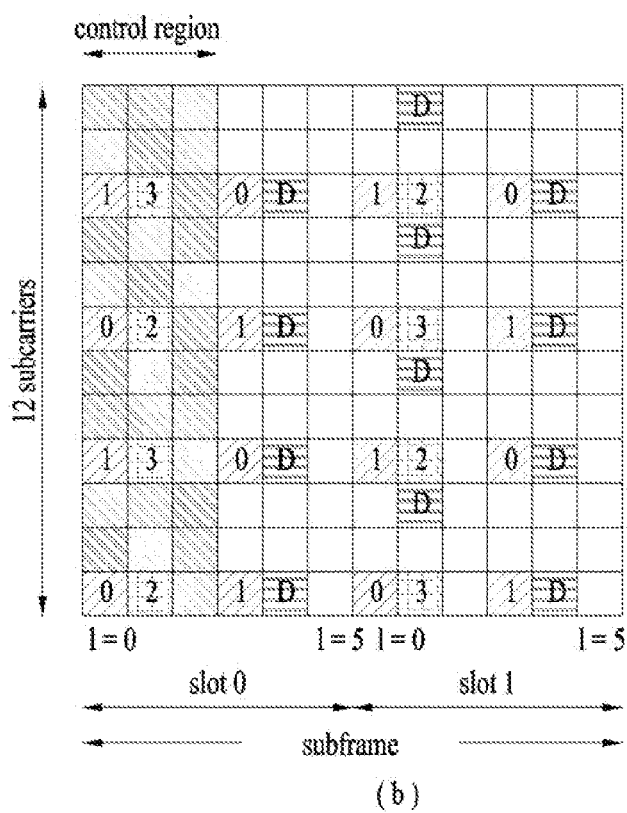
(b)

FIG. 7
☐:Null REs   ▨:CRS
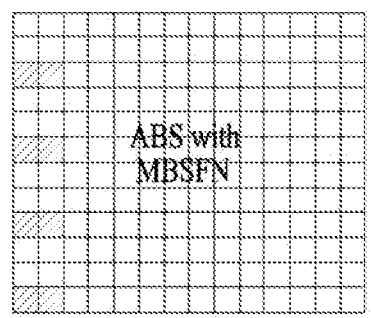   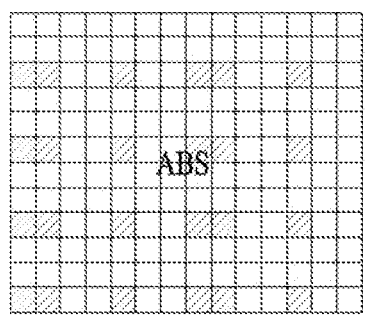
(a)              (b)

METHOD AND DEVICE FOR MEASURING A REFERENCE SIGNAL RECEIVED QUALITY IN WIRELESS COMMUNICATION SYSTEM

CROSS-REFERENCE TO RELATED APPLICATIONS

This application is the National Stage filing under 35 U.S.C. 371 of International Application No. PCT/KR2012/010775, filed on Dec. 12, 2012, which claims the benefit of U.S. Provisional Application Ser. No. 61/569,779, filed on Dec. 12, 2011, the contents of which are hereby incorporated by reference herein in their entirety.

TECHNICAL FIELD

The present invention relates to a wireless communication system, and more particularly to a method and apparatus for measuring a neighbor cell when inter-cell interference (ICI) coordination is applied to a heterogeneous network environment.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide technologies associated with a method for measuring a neighbor cell when inter-cell interference (ICI) coordination is applied to a heterogeneous network environment.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for measuring at least one of first and second Transmission points (TPs) serving as neighbor cells by a user equipment (UE) in a wireless communication system including: measuring Reference Signal Strength Indicator (RSSI) in a predetermined resource of a subframe; and measuring a Reference Signal Received Quality (RSRQ) from the RSSI and Reference Signal Received Power (RSRP), wherein the predetermined resource is associated with an almost blank subframe (ABS) configuration of the first TP regarding the subframe.

In a second technical aspect of the present invention, a user equipment (UE) configured to measure at least one of first and second TPs of a neighbor cell in a wireless communication system includes: a reception (Rx) module; a processor, wherein the processor measures Reference Signal Strength Indicator (RSSI) in a predetermined resource of a subframe, and measures a Reference Signal Received Quality (RSRQ) from the RSSI and Reference Signal Received Power (RSRP), where the predetermined resource is associated with an almost blank subframe (ABS) configuration of the first TP regarding the subframe.

The first and second technical aspects may include all or some parts of the following items.

If the subframe relates to the ABS of the first TP, the predetermined resource may be all orthogonal frequency division multiplexing (OFDM) symbols contained in the subframe, and the RSSI may relate to the second TP.

If the subframe relates to a normal subframe of the first TP, the predetermined resource may be all orthogonal frequency division multiplexing (OFDM) symbols contained in the subframe, and the RSSI may relate to the first TP.

If the subframe relates to a normal subframe of the first TP, the predetermined resource may be all orthogonal frequency division multiplexing (OFDM) symbols through which a cell-specific reference signal (RS) of the first TP is transmitted, and the RSSI may relate to the first TP.

If the subframe relates to a normal subframe of the first TP, the predetermined resource may be all orthogonal frequency division multiplexing (OFDM) symbols related to an antenna port through which a reference signal (RS) of the first TP is transmitted, and the RSSI may relate to the first TP.

The reference signal (RS) may be any one of a cell-specific RS, a demodulation reference signal (DMRS), and a channel status information reference signal (CSI-RS).

The method may include: receiving at least one measurement subframe pattern and measurement resource information corresponding to the at least one measurement subframe pattern from a third TP of a cell including the user equipment (UE), wherein the subframe is contained in any one of the at least one measurement subframe pattern, and the predetermined resource is indicated by measurement resource information corresponding to the measurement subframe pattern including the subframe.

The at least one measurement subframe pattern and the measurement resource information corresponding to the at least one measurement subframe pattern may be decided by the third TP that has received an ABS configuration of the first TP from the first TP, on the basis of the ABS configuration of the first TP.

The ARS configuration of the first TP may be at least one of the ABS pattern of the first TP and a normal subframe pattern.

The at least one measurement subframe pattern and the measurement resource information corresponding to the at least measurement subframe pattern may be contained in a neighbor cell list.

The neighbor cell list serving as system information may be broadcast from the third TP.

The first TP may be a macro eNB (MeNB), and the second TP may be a pico eNB (PeNB).

Advantageous Effects

As is apparent from the above description, the embodiments of the present invention can correctly measure a neighbor cell in a heterogeneous network environment to which inter-cell interference (ICI) coordination is applied.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a conceptual diagram illustrating a reference signal (RS).

FIG. 7 is a conceptual diagram illustrating an Almost Blank Subframe (ABS).

BEST MODE

Figure 1:
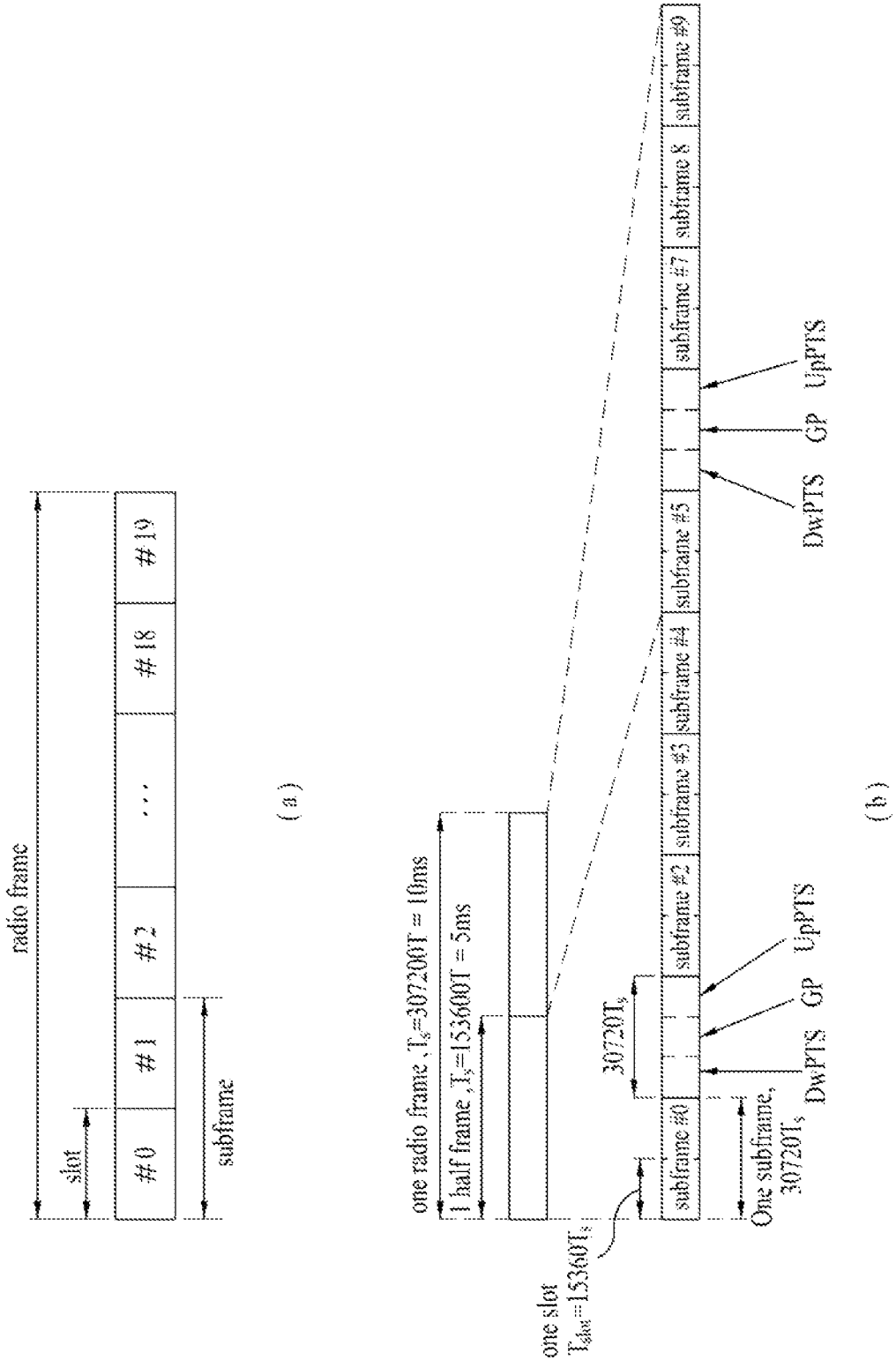
FIG. 1 exemplarily shows a downlink radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

A structure of a radio frame is explained with reference to FIG. 1.

In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type 1 radio frame structure applicable to FDD (frequency division duplex) and a type 2 radio frame structure applicable to TDD (time division duplex) are supported.

FIG. 1 (*a*) is a diagram for a structure of a type 1 radio frame. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDMA in downlink, OFDM symbol is provided to indicate one symbol interval. The OFDM symbol may be named SC-FDMA symbol or symbol interval. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 1 (*b*) is a diagram for a structure of a downlink radio frame of type 2. A type 2 radio frame includes 2 half frames. Each of the half frame includes 5 subframes, a DwPTS (downlink pilot time slot), a GP (guard period), and an UpPTS (uplink pilot time slot). Each of the subframes includes 2 slots. The DwPTS is used for initial cell search, synchronization, or a channel estimation in a user equipment. The UpPTS is used for channel estimation of a base station and matching a transmission synchronization of a user equipment. The guard period is a period for eliminating interference generated in uplink due to multi-path delay of a downlink signal between uplink and downlink. Meanwhile, one subframe includes 2 slots irrespective of a type of a radio frame.

The above-described structures of the radio frame are exemplary only. And, the number of subframes included in a radio frame, the number of slots included in the subframe and the number of symbols included in the slot may be modified in various ways.

Figure 2:
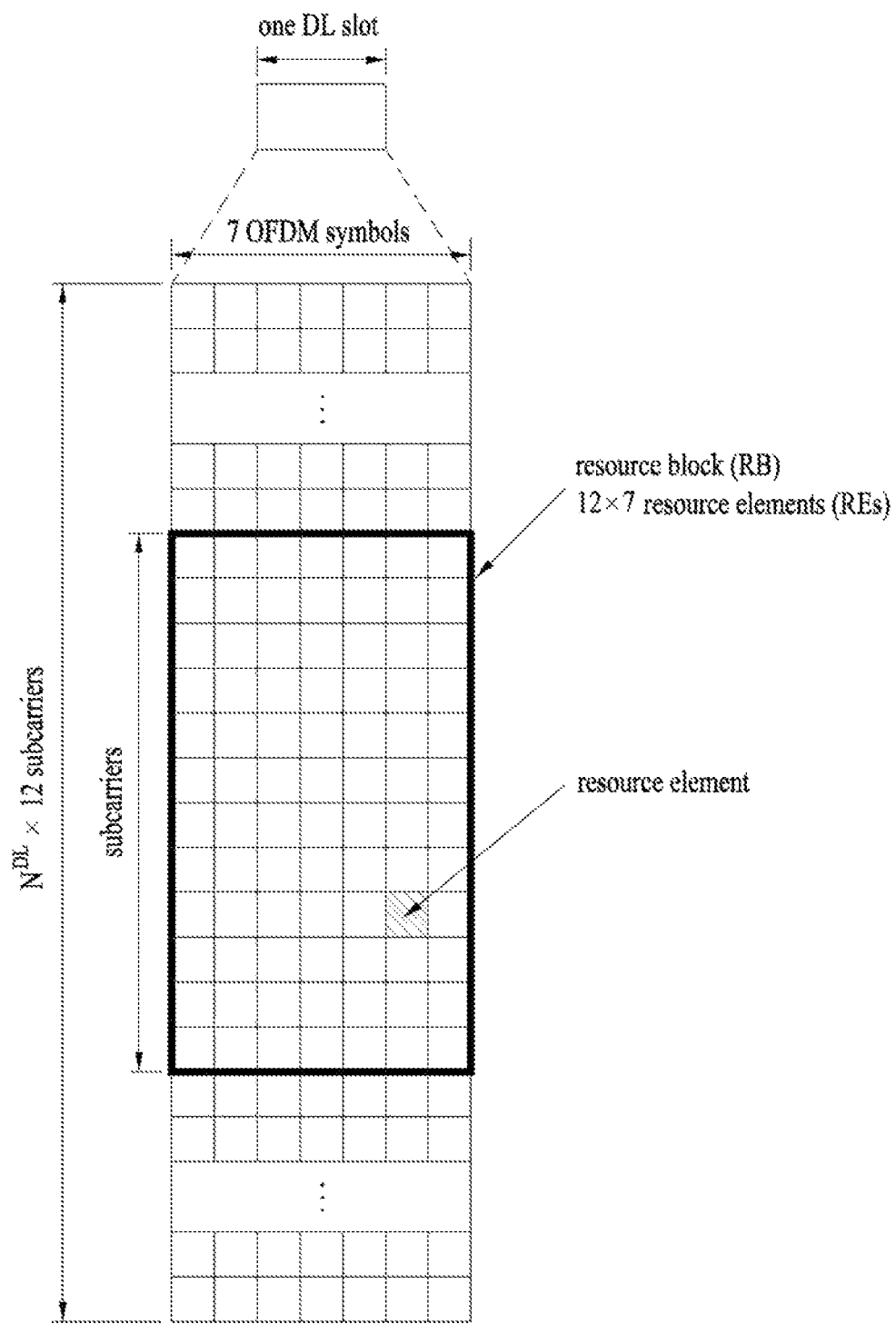
FIG. 2 exemplarily shows a resource grid of one downlink slot.

FIG. 2 is a diagram for a resource grid in a downlink slot. Referring to FIG. 2, one downlink (DL) slot includes 7 OFDM symbols and one resource block (RB) includes 12 subcarriers in frequency domain, by which the present invention may be non-limited. For instance, in case of a normal CP (Cyclic Prefix), one slot includes 7 OFDM symbols. In case of an extended CP, one slot may include 6 OFDM symbols. Each element on a resource grid is called a resource element. One resource block includes 12×7 resource elements. The number $N^{DL}$ of resource blocks included in a DL slot may depend on a DL transmission bandwidth. And, the structure of an uplink (UL) slot may be identical to that of the DL slot.

Figure 3:
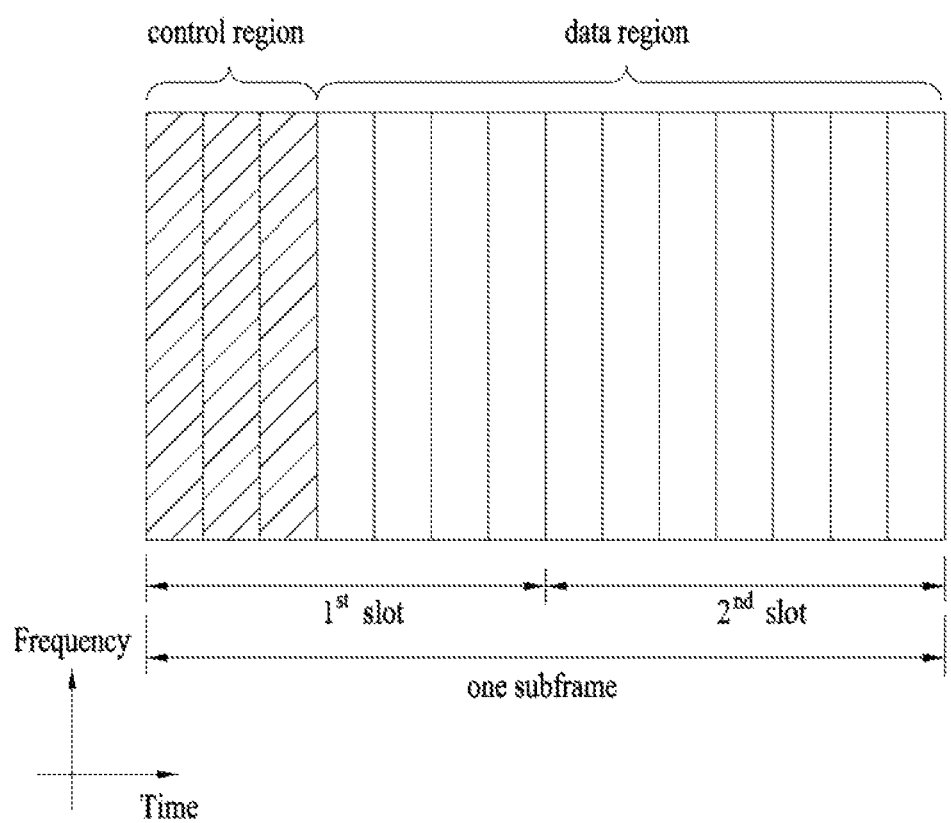
FIG. 3 exemplarily shows a downlink subframe structure.

FIG. 3 is a diagram for a structure of a downlink (DL) subframe. Maximum 3 OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH is a response channel in response to UL transmission and includes an ACK/NACK signal. Control information carried on PDCCH may be called downlink control information (hereinafter abbreviated DCI). The DCI may include UL scheduling information, DL scheduling information or a UL transmit (Tx) power control command for a random UE (user equipment) group. PDCCH is able to carry resource allocation and transmission format (or called a DL grant) of DL-SCH (downlink shared channel), resource allocation information (or called a UL grant) of UL-SCH (uplink shared channel), paging information on PCH (paging channel), system information on DL-SCH, resource allocation to an upper layer control message such as a random access response transmitted on PDSCH, a set of transmission power control commands for individual user equipments within a random user equipment (UE) group, activation of VoIP (voice over IP) and the like. A plurality of PDCCHs can be transmitted in a control region and a user equipment is able to monitor a plurality of the PDCCHs. PDCCH is configured with the aggregation of at least one or more contiguous CCEs (control channel elements). CCE is a logical assignment unit used to provide PDCCH with a code rate in accordance with a state of a radio channel. CCE corresponds to a plurality of REGs (resource element groups). A format of PDCCH and the number of bits of an available PDCCH are determined depending on correlation between the number of CCEs and a code rate provided by the CCEs. A base station determines PDCCH format in accordance with DCI to transmit to a user equipment and attaches CRC (cyclic redundancy check) to control information. The CRC is masked with a unique identifier (called RNTI (radio network temporary identifier)) in accordance with an owner or usage of PDCCH. If the PDCCH is provided for a specific user equipment, the CRC can be masked with a unique identifier of the user equipment, i.e., C-RNTI (i.e., Cell-RNTI). If the PDCCH is provided for a paging message, the CRC can be masked with a paging indication identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI)). In order to indicate a random access response that is a response to a transmission of a random access preamble of a user equipment, CRC can be masked with RA-RNTI (random access-RNTI).

Figure 4:
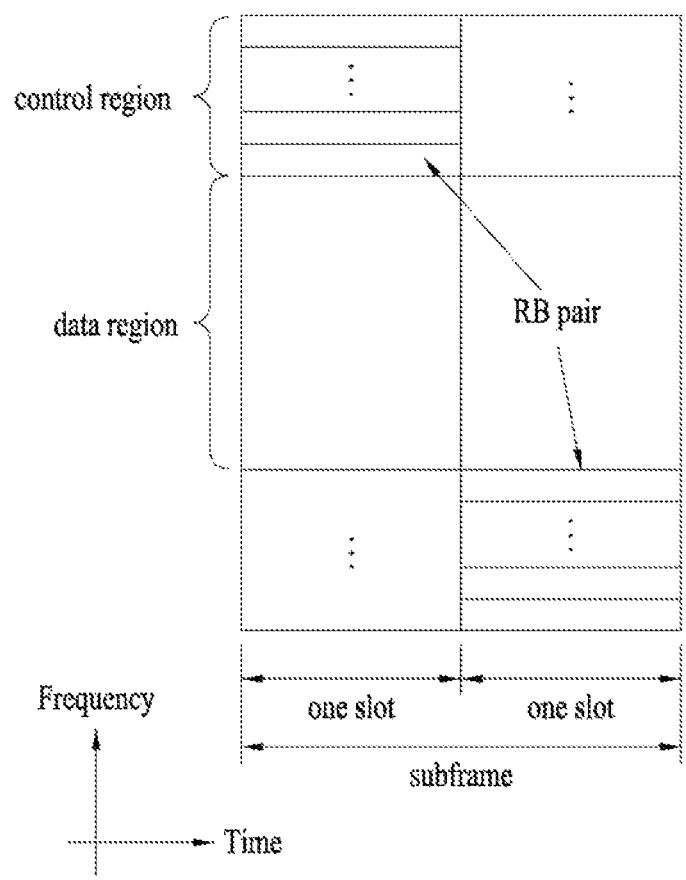
FIG. 4 exemplarily shows an uplink subframe structure.

FIG. 4 is a diagram for a structure of an uplink (UL) subframe. Referring to FIG. 4, a UL subframe may be divided into a control region and a data region in frequency domain. A physical UL control channel (PUCCH), which includes UL control information, is assigned to the control region. And, a physical UL shared channel (PUSCH), which includes user data, is assigned to the data region. In order to maintain single carrier property, one user equipment does not transmit PUCCH and PUSCH simultaneously. PUCCH for one user equipment is assigned to a resource block pair (RB pair) in a subframe. Resource blocks belonging to the resource block (RB) pair may occupy different subcarriers in each of 2 slots. Namely, a resource block pair allocated to PUCCH is frequency-hopped on a slot boundary.

Reference Signal (RS)

When packets are transmitted in a wireless communication system, since the transmitted packets are transmitted via a radio channel, signal distortion may occur in a transmission process. In order to enable a receiver to accurately receive the distorted signal, distortion of the received signal should be corrected using channel information. In order to detect the channel information, a method of transmitting a signal which is known to a transmitter and a receiver and detecting channel information using a distortion degree when the signal is received via the channel is mainly used. The signal is referred to as a pilot signal or a reference signal.

If data is transmitted and received using multiple antennas, a channel state between each transmission antenna and each reception antenna should be known in order to accurately receive a signal. Accordingly, a reference signal is present per transmission antenna and, more particularly, per antenna port.

The reference signal may be divided into an uplink reference signal and a downlink reference signal. In a current LTE system, the uplink reference signal includes:

i) a demodulation reference signal (DM-RS) for channel estimation for coherent demodulation of information transmitted via a PUSCH and a PUCCH, and ii) a sounding reference signal (SRS) for measuring uplink channel quality of a network at different frequencies at the BS.

The downlink reference signal includes:

i) a cell-specific reference signal (CRS) shared by all UEs in the cell, ii) a UE-specific reference signal for a specific UE, iii) a demodulation-reference signal (DM-RS) transmitted for coherent demodulation if a PDSCH is transmitted, iv) a channel state information-reference signal (CSI-RS) for delivering channel state information (CSI) if a downlink DMRS is transmitted, v) an MBSFN reference signal transmitted for coherent demodulation of a signal transmitted in a multimedia broadcast single frequency network (MBSFN) mode, and vi) a positioning reference signal used to estimate geographical position information of the UE.

The reference signals may be broadly divided into two reference signals according to the purpose thereof. There are a reference signal for acquiring channel information and a reference signal used for data demodulation. Since the former reference signal is used when the UE acquires channel information in downlink, the reference signal is transmitted over a wide band and even a UE which does not receive downlink data in a specific subframe should receive the reference signal. This reference signal is used even in handover. The latter reference signal is sent by the BS along with resources in downlink. The UE receives the reference signal to perform channel measurement and data modulation. This reference signal is transmitted in a region in which data is transmitted.

The CRS is used for two purposes such as channel information acquisition and data demodulation and the UE-specific reference signal is used only for data demodulation.

The CRS is transmitted per subframe over a wide band and reference signals for a maximum of four antenna ports are transmitted according to the number of transmit antennas of the base station.

For example, if the number of transmit antennas of the base station is 2, CRSs for antenna ports 0 and 1 are transmitted and, if the number of transmit antennas of the base station is 4, CRSs for antenna ports 0 to 3 are transmitted.

FIG. 5 is a diagram illustrating a pattern in which CRSs and DRSs defined in a legacy 3GPP LTE system (e.g., release-8) are mapped onto resource block (RB) pairs. A downlink RB pair as a mapping unit of a reference signal may be expressed by one subframe on a time axis and 12 subcarriers on a frequency axis. That is, one RB pair has 14 OFDM symbols in case of a normal CP (FIG. 5(a)) and 12 OFDM symbols in case of an extended CP (FIG. 5(b)).

FIG. 5 shows locations of the reference signals on the RB pairs in a system in which the base station supports four transmit antennas. In FIG. 5, resource elements (REs) denoted by "0", "1", "2" and "3" represent the locations of the CRSs for antenna port indices 0, 1, 2 and 3. Meanwhile, the RE denoted by "D" represents the location of the DMRS.

Heterogeneous Deployment

Figure 6:
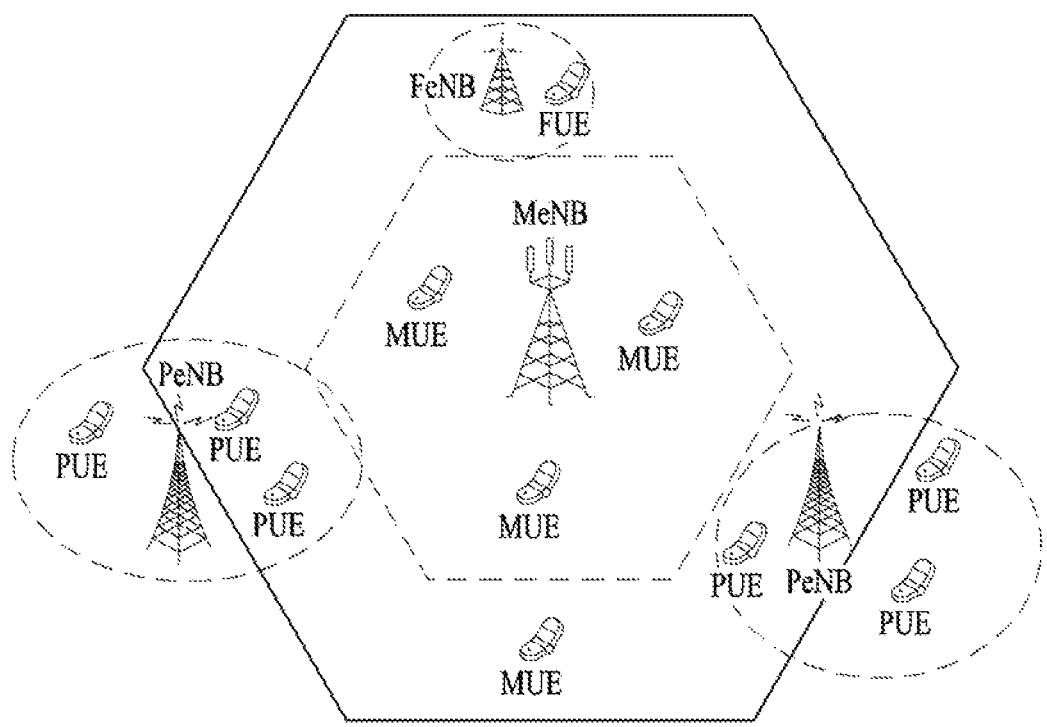
FIG. 6 is a conceptual diagram illustrating a heterogeneous network environment.

FIG. 6 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to hand over to the CSG eNB.

Inter-Cell Interference Coordination (ICIC)

In the above-mentioned heterogeneous network environment (heterogeneous deployment) or CoMP environment, inter-cell interference (ICI) may occur. In order to solve the inter-cell interference (ICI) problem, inter-cell interference coordination (ICIC) may be used.

As exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP LTE Release-8 system. A variety of parameters may be contained in an ICIC message for frequency resources. For example, a Relative Narrowband Transmission Power (RNTP) related to downlink transmission power, uplink (UL) Interference Overhead Indication (MI) related to uplink interference, UL High Interference Indication (HII), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even under high interference are scheduled in another frequency sub-region in which an HII is set to a first value (for example, 1), one cell having received the ICIC message can avoid interference from another cell having transmitted the ICIC message.

On the other hand, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of the silencing operation, a specific cell may configure a specific subframe as an Almost Blank Subframe (ABS) with Multicast-Broadcast Single Frequency Network (MBSFN) ("ABS with MBSFN") subframe". In a downlink subframe configured as the "ABS with MBSFN" subframe, a signal is transmitted only in a control region and is not transmitted in a data region, as shown in FIG. 7(a). As another example of the silencing operation, a cell causing interference may configure a specific frame as a specific Almost Blank Subframe (ABS). As shown in FIG. 7(b), the ABS refers to a subframe in which only a CRS is transmitted in a control region and a data region of a downlink subframe and the remaining control information and data other than the CRS are not transmitted in the control and data regions of the downlink subframe. If necessary, signals are transmitted at no power or low power in the subframe corresponding to the ABS. Nonetheless, downlink channels and downlink signals such as a Physical Broadcast Channel (PBCH), a Primary Synchronization Signal (PSS), and a Secondary Synchronization Signal (SSS) may be transmitted even in the ABS. As described above, silencing may be performed in units of a specific subframe, and information indicating whether silencing is performed is referred to as a silent subframe pattern. (The term "ABS" in the following description may refer to any one of a specific Almost Blank Subframe (ABS) or an ABS-with-MBSFN unless specifically mentioned otherwise.)

In association with ABS, ABS signaling defined in 3GPP LTE-A is largely classified into ABS information and ABS status. The ABS information indicates a subframe to be used as ABS using bitmap. The ABS information is composed of 40 bits in case of FDD, and is composed of a maximum of 70 bits in case of TDD. The number of bits used for ABS information in TDD may be changed according to UL-DL configuration. In case of FDD, 40 bits indicate 40 subframes. If the value of a bit is set to 1, the bit indicates ABS. If the value of a bit is set to zero, the bit indicates non-ABS. When restricted measurement is configured in a UE, the number of CRS antenna ports of the corresponding cell is notified for CRS measurement. A measurement subset is a subset of ABS pattern information. The measurement subset is a bitmap composed of 40 bits in case of FDD, and is a bitmap composed of a maximum of 70 bits in case of TDD. The above information can be understood as a restricted measurement for configuring restricted measurement. Table 3 indicates ABS information defined in the legacy LTE/LTE-A system.

Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has failed.

RSRP is defined as the linear average over the power contributions of REs that carry downlink CRSs.

RSSI is defined as the linear average of the total received power of a UE. The RSSI is measured from OFDM symbols carrying RSs for antenna port 0, including interference and noise power from neighbor cells. If a specific subframe is

TABLE 3

| IE/Group Name | Presence | Range | IE type and reference | Semantics description |
|---|---|---|---|---|
| CHOICE ABS Information | M | | — | — |
| >FDD | | | — | — |
| >>ABS Pattern Info | M | | BIT STRING (SIZE(40)) | Each position of bitmap indicates a DL subframe, 1 indicates ABS, and 0 indicates a non-ABS. In a radio frame of SFN = 0, a first position of the ABS pattern corresponds to a subframe 0, and a maximum number of subframes is 40. |
| >>Number Of Cell-specific Antenna Ports | M | | ENUMERATED (1, 2, 4, . . . ) | P-The number of antenna ports for cell-specific reference signal |
| >>Measurement Subset | M | | BIT STRING (SIZE(40)) | This indicates a subset of ABS pattern information, and may be used to configure specific measurement for UE. |
| >TDD | | | — | — |
| >>ABS Pattern Info | M | | BIT STRING (1 . . . 70, . . . ) | Each position of bitmap indicates a DL subframe, 1 indicates ABS, and 0 indicates a non-ABS. A maximum number of subframes is dependent upon UL/DL subframe configuration. In case of UL/DL subframe configurations 1~5, a maximum number of subframes is set to 20. In case of UL/DL subframe configuration 6, a maximum number of subframes is set to 60. In case of UL/DL subframe configuration 0, a maximum number of subframes is set to 70. A first position of an ABS pattern in the radio frame of SFN = 0 corresponds to Subframe 0. ABS pattern is continuously repeated in all radio frames, and restarts from SFN = 0. |
| >>Number Of Cell-specific Antenna Ports | M | | ENUMERATED (1, 2, 4, . . . ) | P-The number of antenna ports for cell-specific reference signal |
| >>Measurement Subset | M | | BIT STRING (1 . . . 70, . . . ) | This indicates a subset of ABS pattern information, and may be used to configure specific measurement for UE. |
| >ABS Inactive | M | | NULL | If ABS is deactivated, this means interference coordination. |

The ABS status information elements are used to enable the eNB to determine whether the ABS pattern must be changed.

Measurement/Measurement Report

A measurement report is used in many techniques designed to ensure the mobility of UEs (handover, random access, cell search, etc.) or for one of the techniques. Since the measurement report requires a certain degree of coherent demodulation, a UE may perform measurement after acquiring synchronization and physical layer parameters, except for measurement of received signal strength. The measurement report conceptually covers Radio Resource Management (RRM) measurement of measuring the signal strengths or signal strengths to total reception power of a serving cell and neighbor cells, including Reference Signal Received indicated for RSRQ measurement by higher-layer signaling, the RSSI is measured over all OFDM symbols of the indicated subframe.

RSRQ is defined as (N*RSRP/RSSI), where N is the number of RBs over the measurement bandwidth of RSSI.

Basically, measurement reporting is performed using CRS. In an embodiment of the present invention, measurement reporting may be performed using one or a selective combination of CRS, CSI-RS, and DMRS. In addition, the measurement reporting may also be performed with respect to a specific antenna port(s) from among antenna ports through which RSs are transmitted or with respect to a specific RS configuration (e.g., a plurality of CSI-RS configurations may be allocated to the same subframe, and each CSI-RS configuration may include CSI-RSs for 2, 4, or 8 ports which may be transmitted at different time points).

Transmission or non-transmission of a measurement report can be determined by the following event-based measurement report decisions i) to v).

i) In Decision i), a measurement value of the serving cell is higher than an absolute threshold value (i.e., serving cell becomes better than absolute threshold).

ii) In Decision ii), a measurement value of the serving cell is lower than an absolute threshold value (i.e., serving cell becomes worse than absolute threshold).

iii) In Decision iii), a measurement value of a neighboring cell is higher than a measurement value of the serving cell by an offset value (i.e., neighboring cell becomes better than an offset relative to the serving cell).

iv) In Decision iv), a measurement value of a neighboring cell is higher than an absolute threshold value (i.e., neighboring cell becomes better than absolute threshold).

v) In Decision v), a measurement value of the serving cell is lower than an absolute threshold value, and a measurement value of the neighboring cell is higher than another absolute threshold value (i.e., serving cell becomes worse than one absolute threshold and neighboring cell becomes better than another absolute threshold).

In Decision (i)~(v), the measurement value may be an RSRP, etc.

Measurement reporting may be transmitted only when individual conditions for the above-mentioned decisions are maintained for a predetermined time or longer configured in a network.

Figure 8:
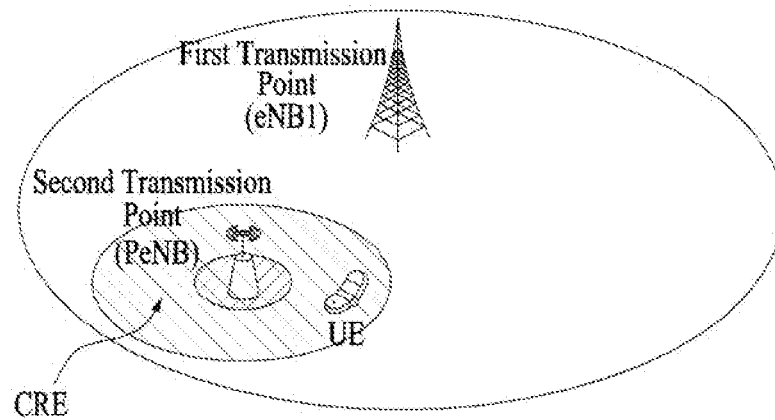
FIGS. 8 and 9 are conceptual diagrams illustrating measurement report in a heterogeneous network environment in which inter-cell interference coordination (ICIC) is performed.

FIG. 8 is a conceptual diagram illustrating measurement report for use in a heterogeneous network environment in which ICIC is performed.

FIG. 8 shows a heterogeneous network environment which exemplarily includes a macro eNB (eNB1, first TP) and a pico eNB (PeNB, second TP). It is assumed that the first TP configures the ABS for interference mitigation. In this case, the second TP may schedule a UE using a subframe in which the first TP is configured as ABS and a subframe aligned on a time axis. This means that a cell range extension (CRE) of the second TP is possible.

Under this situation, a method for enabling a user equipment (UE) to measure RSSI of the second TP is carried out in all OFDM symbols of the corresponding subframe as described above. As a result, CRS is transmitted in the subframe (specifically, in a subframe not corresponding to 'ABS with MBSFN') in which the first TP is configured as an ABS, such that influence of CRS power can be reduced in RSSI measurement. In more detail, if the CRS power of the first TP is contained in the RSSI measurement process, excessive RSSI is measured, and reduction of RSRQ accuracy is reduced. In order to address the above-mentioned problem, the above RSSI measurement of the second TP is needed.

The above-mentioned measurement method can reduce the problem encountered in measurement of a UE contained in the first TP and the second TP. If a UE not contained in the first and second TPs (e.g., a UE contained in another macro eNB (i.e., a third TP)) performs neighbor cell measurement, inaccuracy in RSSI/RSRQ measurement may occurs, and a detailed description thereof will hereinafter be described with reference to FIG. 9.

Figure 9:
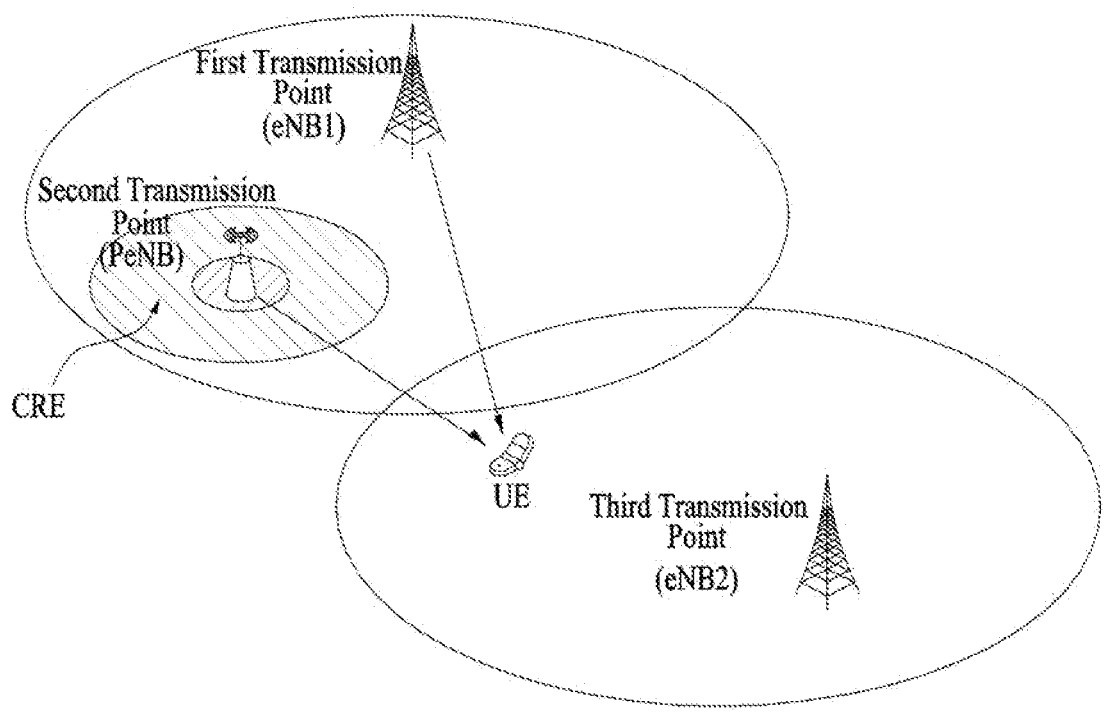

FIG. 9 is a conceptual diagram illustrating a method for measuring a neighbor cell of a UE contained in a third TP (eNB2) under the situation of FIG. 8. Referring to FIG. 9, a UE is contained in a cell region of a cell region of the third TP, measures a neighbor cell of the first TP (eNB1) and the second TP (PeNB), and it is assumed that the first TP and the second TP perform interference coordination through a time-domain ICIC. That is, it is assumed that the same environment as the situation of FIG. 8 is used. Preferably, a method for enabling the UE to measure a neighbor cell of the second TP may be performed in a subframe in which the first TP is configured as ABS so as to perform measurement in an actual operation period of a CRE of the second TP. That is, RSSI measurement of the second TP may be used by all OFDM symbols on a subframe of the second TP, wherein the subframe is aligned with the subframe in which the first TP is configured as ABS.

On the other hand, if neighbor cell measurement of the first TP is performed in the subframe in which the first TP is configured as ABS, the power of data (e.g., PDSCH) transferred by the first TP is not contained in the RSSI measurement process, so that RSSI is lower than that of a normal subframe and RSRQ is relatively higher than that of the normal subframe. In addition, if RSSI is measured in the subframe in which the first TP is configured as a normal subframe, dominant interference does not occur even in the case in which measurement based on the legacy LTE 8 and 9 (i.e., measurement in an OFDM symbol mapped to a reference signal corresponding to Antenna Port 0) is performed, no problem occurs, such that the corresponding subframe must be a normal subframe.

In order to address the above-mentioned problem, the present invention proposes a method for configuring resources used in measurement per subframe for measurement, and a detailed description thereof will hereinafter be described with reference to FIG. 10.

Figure 10:
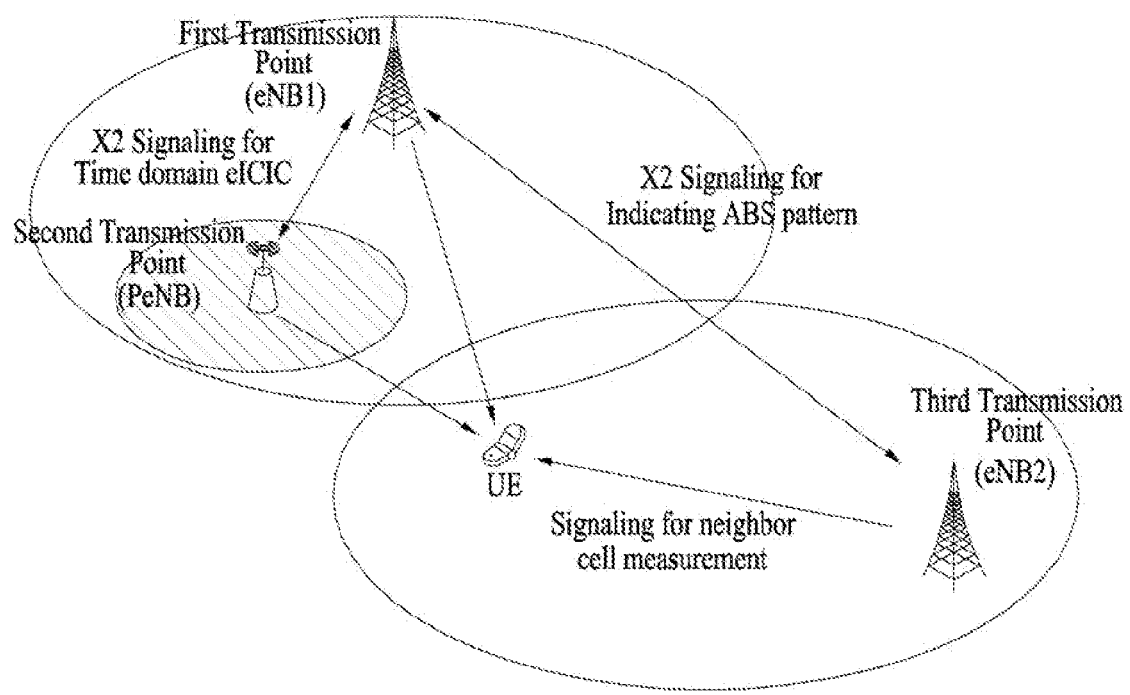
FIG. 10 is a conceptual diagram illustrating a method for measuring a neighbor cell according to the embodiments.

In FIG. 10, it is assumed that an ABS is configured for the second TP (PeNB) in which the first TP (eNB1) acting as a macro eNB is a pico eNB as shown in FIG. 9, and a UE contained in a third TP (eNB2) measures an RSSI of the first or second TP serving as a neighbor cell. The network environment shown in FIG. 10 is only exemplary, and can be replaced with another network environment applicable to the present invention.

If the UE measures RSSI of the neighbor at a specific subframe, a predetermined resource associated with ABS configuration of the first TP of a specific subframe may be used as an RSSI measurement reference. In this case, the specific subframe may be indicated through higher layer signaling for RSRQ measurement. In this case, the ABS configuration of the first TP may be any one of an ABS pattern and normal subframe pattern of the first TP.

If the specific subframe corresponds to the subframe in which ABS is configured by the first TP (or a subframe having a high probability of ABS configuration), UE measurement may relate to a second TP from among neighbor cells. In this case, the predetermined resource may be all OFDM symbols contained in the specific subframe. Simultaneously with or separately from the above-mentioned concept, if the above specific subframe is a subframe in which the first TP is configured as a normal subframe instead of ABS (or the specific subframe is a high probability that the subframe operates a normal subframe), UE measurement relates to the first TP from among the neighbor cells. In this case, a predetermined resource may be any one of i) all OFDM symbols contained in the specific subframe, ii) an OFDM symbol in which CRS of the first TP is transmitted, and iii) an OFDM symbol related to an antenna port through which a reference signal (CRS, DMRS, CSI-RS, etc.) of the first TP is transmitted.

The above-mentioned contents have been disclosed on the basis of the relationship among a subframe, a measurement resource and a neighbor cell in a neighbor cell measurement process of the UE. In the above-mentioned description, a specific subframe may be contained in any one of one or more measurement subframe patterns configured to measure each TP by the third TP configured to receive ABS configuration information of the first TP through X2 signaling or the like. In addition, the above-mentioned predetermined resource may be a measurement resource corresponding to a measurement subframe pattern including the specific subframe.

In other words, for measurement of a UE that uses a first TP as a neighbor cell, the third TP may configure a first measurement subframe pattern for the first TP and a first measurement resource related to this measurement subframe pattern on the basis of the ABS configuration information of the first TP. In this case, the first subframe pattern may be all or some parts of the subframes configured as normal subframes at the first TP. The first measurement resource may be any one of i) all OFDM symbols contained in the specific subframe, ii) OFDM symbol in which CRS of the first TP is transmitted, and iii) an OFDM symbol related to an antenna port through which RSs (CRS, DMRS, CSI-RS, etc.) of the first TP are transmitted.

In order to measure a UE that uses the second TP as a neighbor cell, the third TP may configure a second measurement subframe pattern for the second TP and a second measurement resource for this measurement subframe pattern. In this case, the second measurement subframe pattern may be all or some parts of the subframes configured as normal subframes at the first TP, and the second measurement subframe may be all OFDM symbols contained in the subframe.

In addition, a measurement subframe pattern and a measurement resource corresponding to the measurement subframe may be contained in a neighbor cell list that is broadcast by the third TP through system information (SI). Alternatively, the measurement subframe pattern and the measurement resource corresponding to the measurement subframe may be transferred through UE-specific higher layer signaling.

In summary, a specific UE receives at least one subframe pattern and a resource region (for example, all OFDM symbols, symbols in which RS of Antenna Port 0 is transmitted, etc.) to be used for measurement of each pattern from a TP serving as a macro eNB to which the specific UE pertains, such that it can perform measurement of each pattern.

Signaling needed for the above-mentioned contents according to Tx entities will hereinafter described.

An ABS pattern and/or a normal subframe pattern may be exchanged between the macro eNBs (i.e., between the first TP and the third TP) through X2 signaling or the like.

In more detail, in association with the ABS pattern, the first TP may inform the neighbor TPs of the subframe set (or a subframe set having a high probability of causing ABS configuration) in which the first TP configures the ABS to implement ICIC between a pico cell contained in a cell of the first TP and the second TP, through X2 signaling. In this case, the ABS pattern may be a subframe in which a TP for signaling is configured as the ABS, or may be a subframe set in which the neighbor TPs perform ABS measurement.

In association with the normal subframe pattern, the first TP may inform the neighbor TPs of either a subframe set in which the first TP operates as a normal subframe or another subframe set having a high probability of operating as a normal subframe through X2 signaling. {Alternatively, a normal subframe pattern is not separately signaled, or the subframes (each of which is indicated by '0' in the above-mentioned ABS pattern) may be recognized as subframes having a high probability that the subframe operate as the normal subframe.} In this case, the normal subframe pattern may be a subframe set in which a TP for signaling is configured as a normal subframe, or may be a subframe set in which the neighbor TPs measure the normal subframe.

Continuously, information signaled by a TP (i.e., a third TP of FIG. 10) of a UE configured to measure the neighbor cell will hereinafter be described in detail.

First, the neighbor cell list contained in system information is broadcast, and the third TP may perform restricted measurement (i.e., measurement subframe pattern, measurement symbol pattern) through the neighbor cell list. For this purpose, a measurement subframe pattern to be measured and information of resources to be measured within a subframe contained in this measurement subframe pattern may be included in the legacy neighbor cell list. In this case, the resource information may be any one of i) all OFDM symbols contained in a subframe, ii) OFDM symbol for CRS transmission at Antenna Port #0, and iii) an OFDM symbol associated to the antenna port (i.e., OFDM symbol associated with CRS, DMRS, CSI-RS, etc.).

Second, a resource to be used for measurement of a specific cell may be signaled to a specific UE through UE-specific RRC signaling. In this case, the resource to be used may be signaled through a combination of a subframe pattern and a specific resource of this pattern.

In association with the above-mentioned description, at least one subframe pattern (specifically, a measurement pattern of a neighbor cell) to be used by the TP without additional signaling the measurement resource is transmitted, and a measurement resource of RSSI or the like may be decided according to each pattern index. For example, in case of using the measurement subframe pattern 1 (or the measurement subframe set 1), all OFDM symbols contained in a subframe indicated by a pattern are configured to be measured, and the OFDM symbols may be used to measure a pico cell (or a victim cell in ICIC). In the measurement case of using the measurement subframe pattern 2, CRS power 0 (or a specific port of a specific RS) contained in a subframe indicated by the pattern may be configured as an OFDM symbol, and this may be used to measure an aggressor cell in a macro eNB (or ICIC).

Figure 11:
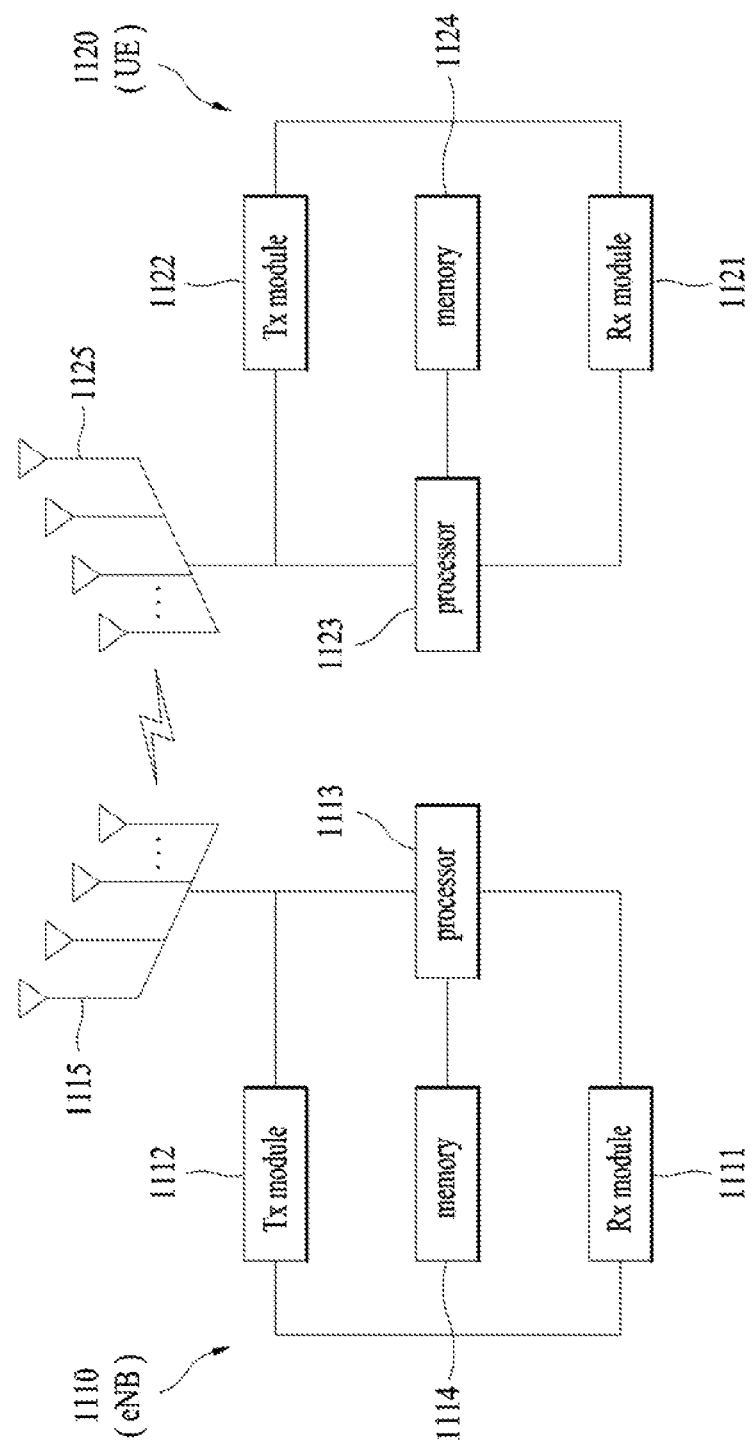
FIG. 11 is a block diagram illustrating a transmission point apparatus and a UE device according to embodiments of the present invention.

FIG. 11 is a block diagram illustrating a transmission point apparatus and a UE device according to embodiments of the present invention.

Referring to FIG. 11, the transmission point apparatus 1110 according to the present invention may include a reception (Rx) module 1111, a transmission (Tx) module 1112, a processor 1113, a memory 1114, and a plurality of antennas 1115. The plurality of antennas 1115 indicates a transmission point apparatus for supporting MIMO transmission and reception. The reception (Rx) module 1111 may receive a variety of signals, data and information on an uplink starting from the UE. The Tx module 1112 may transmit a variety of signals, data and information on a downlink for the UE. The processor 1113 may provide overall control to the transmission point apparatus 1110.

The processor 1113 of the transmission point apparatus 1110 according to one embodiment of the present invention can process various operations needed for the above-mentioned embodiments using a first TP device and a second TP device.

The processor 1113 of the transmission point apparatus 1110 processes information received at the transmission point apparatus 1110 and transmission information to be transmitted externally. The memory 1114 may store the processed information for a predetermined time. The memory 1114 may be replaced with a component such as a buffer (not shown).

Referring to FIG. 11, the UE device 1120 may include an Rx module 1121, a Tx module 1122, a processor 1123, a memory 1124, and a plurality of antennas 1125. The plurality of antennas 1125 indicates a UE apparatus supporting MIMO transmission and reception. The Rx module 1121 may receive downlink signals, data and information from the BS (eNB). The Tx module 1122 may transmit uplink signals, data and information to the BS (eNB). The processor 1123 may provide overall control to the UE device 1120.

The processor 1123 of the UE device 1120 according to one embodiment of the present invention can process various operations needed for the above-mentioned embodiments.

The processor 1123 of the UE device 1120 processes information received at the UE apparatus 1120 and transmission information to be transmitted externally. The memory 1124 may store the processed information for a predetermined time. The memory 1124 may be replaced with a component such as a buffer (not shown).

The specific configurations of the transmission point apparatus and the UE device may be implemented such that the various embodiments of the present invention are performed independently or two or more embodiments of the present invention are performed simultaneously. Redundant matters will not be described herein for clarity.

The description of the transmission point apparatus 1110 shown in FIG. 11 may be applied to a relay node (RN) acting as a DL transmission entity or UL reception entity without departing from the scope or spirit of the present invention. In addition, the description of the UE device 1120 may be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for measuring at least one of first and second transmission points (TPs) of a neighbor cell by a user equipment (UE) including a processor and a receiver, the UE belonging to a third TP of a serving cell in a wireless communication system, the method comprising:
   receiving, by the UE, an almost blank subframe (ABS) pattern of the first TP from the third TP;
   determining, by the UE, whether to use all orthogonal frequency division multiplexing (OFDM) symbols contained in a subframe or to use OFDM symbols, used for transmitting a reference signal (RS) of the first TP, among the OFDM symbols in the subframe for measuring Reference Signal Strength Indicator (RSSI) according to whether the subframe is corresponding to the ABS or a normal subframe based on the ABS pattern of the first TP;
   measuring, by the UE, the RSSI in the determined OFDM symbols of the subframe;
   measuring, by the UE, a Reference Signal Received Quality (RSRQ) based on the RSSI;
   transmitting a measurement report including the RSRQ to the third TP; and
   receiving at least one measurement subframe pattern and measurement resource information corresponding to the at least one measurement subframe pattern from a third TP of a cell including the user equipment (UE), wherein the subframe is contained in any one of the at least one measurement subframe pattern, and the OFDM symbols are indicated by measurement resource information corresponding to the measurement subframe pattern including the subframe, and
   wherein the at least one measurement subframe pattern and the measurement resource information corresponding to the at least one measurement subframe pattern are decided by the third TP that has received an ABS pattern of the first TP from the first TP, on the basis of the ABS pattern of the first TP.

2. The method according to claim 1, wherein:
   if the subframe corresponds to the ABS subframe, all OFDM symbols contained in the subframe are used for measuring RSSI, and the RSSI relates to the second TP.

3. The method according to claim 1, wherein:
if the subframe corresponds to the normal subframe, all OFDM contained in the subframe are used for measuring RSSI, and the RSSI relates to the first TP.

4. The method according to claim 1, wherein:
if the predetermined resource is on the normal subframe, all OFDM symbols through which a cell-specific RS of the first TP is transmitted, are used for measuring RSSI and the RSSI relates to the first TP.

5. The method according to claim 1, wherein:
if the predetermined resource is on the normal subframe, all OFDM symbols, related to an antenna port through which the RS of the first TP is transmitted, are used for measuring RSSI and the RSSI relates to the first TP.

6. The method according to claim 1, wherein the RS is one of a cell-specific RS, a demodulation reference signal (DMRS), or a channel status information reference signal (CSI-RS).

7. The method according to claim 1, wherein the ABS pattern of the first TP is at least one of the ABS pattern of the first TP and a normal subframe pattern.

8. The method according to claim 1, wherein the at least one measurement subframe pattern and the measurement resource information corresponding to the at least measurement subframe pattern are contained in a neighbor cell list.

9. The method according to claim 8, wherein the neighbor cell list serving as system information is broadcast from the third TP.

10. The method according to claim 1, wherein the first TP is a macro eNB (MeNB), and the second TP is a pico eNB (PeNB).

11. A user equipment (UE) configured to measure at least one of first and second transmission points (TPs) of a neighbor cell in a wireless communication system, the UE belonging to a third TP of a serving cell, the UE comprising:
a receiver;
a processor connected to the receiver and configured to:
receive an almost blank subframe (ABS) pattern of the first TP from the third TP;
determine whether to use all orthogonal frequency division multiplexing (OFDM) symbols contained in a subframe or to use OFDM symbols, used for transmitting a reference signal (RS) of the first TP, among the OFDM symbols in the subframe for measuring Reference Signal Strength Indicator (RSSI) according to whether the subframe is corresponding to the ABS or a normal subframe based on the ABS pattern of the first TP;
measure the RSSI in the determined OFDM symbols of the subframe;
measure a Reference Signal Received Quality (RSRQ) based on the RSSI,
transmit a measurement report including the RSRQ to the third TP, and
receive at least one measurement subframe pattern and measurement resource information corresponding to the at least one measurement subframe pattern from a third TP of a cell including the user equipment (UE),
wherein the subframe is contained in any one of the at least one measurement subframe pattern, and the OFDM symbols are indicated by measurement resource information corresponding to the measurement subframe pattern including the subframe, and
wherein the at least one measurement subframe pattern and the measurement resource information corresponding to the at least one measurement subframe pattern are decided by the third TP that has received an ABS pattern of the first TP from the first TP, on the basis of the ABS pattern of the first TP.

* * * * *